United States Patent [19]

Pannell

[11] 4,177,343

[45] Dec. 4, 1979

[54] PURIFICATION OF POLYMER SOLUTION

[75] Inventor: Calvin E. Pannell, Walnut Creek, Calif.

[73] Assignee: The Dow Chemical Company, Midland, Mich.

[21] Appl. No.: 861,610

[22] Filed: Dec. 19, 1977

[51] Int. Cl.$^2$ .................. C08J 3/00; C08G 63/74; C08G 63/62
[52] U.S. Cl. .................. 528/482; 528/196; 525/462
[58] Field of Search .................. 260/47 XA; 528/196, 528/197, 482

[56] References Cited

U.S. PATENT DOCUMENTS

| | | | |
|---|---|---|---|
| 2,865,960 | 12/1958 | Shearer et al. | 528/482 |
| 3,036,036 | 5/1962 | Howe | 260/47 XA |
| 3,141,005 | 7/1964 | Noll | 528/482 |
| 3,144,432 | 8/1964 | Fox | 260/47 XA |
| 3,437,639 | 4/1969 | Beach et al. | 260/47 XA |
| 3,939,118 | 2/1976 | Horbach et al. | 260/47 XA |

OTHER PUBLICATIONS

Polycarbonates; E. D. Oliver, Stanford Research Institute Report No. 50, pp. 26–33, Apr. 1969.
Polycarbonates; E. D. Oliver, Stanford Research Institute Report 50A Supplement, pp. 7 & 32–37, Sep. 1975.

*Primary Examiner*—Wilbert J. Briggs, Sr.
*Attorney, Agent, or Firm*—G. D. Street

[57] ABSTRACT

Undesired impurities in polymer solutions, such as amine scavenging agents or hydrochloric acid, are removed by passing a contaminated polymer solution through a strong acid cation exchange resin bed.

8 Claims, No Drawings

PURIFICATION OF POLYMER SOLUTION

BACKGROUND OF THE INVENTION

The present invention relates to the removal of harmful or undesired contaminants from polymer solutions, particularly from polycarbonate polymer solutions, using a strong acid cation exchange resin.

In the prior art, there are several known methods of removing contaminants or undesired by-products, particularly organic contaminants such as pyridine hydrochloride, from polymer solutions, such as polycarbonate polymer solutions. The presence of residual amounts of such impurities in the polymer usually renders the polymer less stable to heat and affects the clarity and light transmission properties thereof. Generally, the prior art is directed to the use of a multi-stage water wash to achieve a polycarbonate polymer solution containing impurities in the parts per million (ppm) level desired.

Other methods, such as set forth in U.S. Pat. No. 3,144,432, concern the use of certain materials in the preparation of the polycarbonate solution which act as non-solvents for the pyridine hydrochloride impurity. Such non-solvents cause the impurity to precipitate, therefore enabling easy separation of the same from the polymer solution. However, such method does not completely remove the impurity and the polymer solution must be subjected to time-consuming distillation to remove substantially all of the residual impurity. Another impurity precipitation method is disclosed in U.S. Pat. No. 3,437,639, wherein excess tertiary amine in a polycarbonate solution is precipitated by use of a hydrogen halide gas and non-solvent.

It is, therefore, an object of this invention to provide a novel and improved method for removing undesired organic contaminates from polymer solutions. Another object is to provide a novel and improved method for removing undesired pyridine hydrochloride from polycarbonate polymer solutions.

SUMMARY OF THE INVENTION

The process of the present invention comprises contacting a polymer solution containing undesired materials, e.g., impurities or contaminants with a strong acid cation exchange resin bed, thereby removing substantially all of the undesired material therefrom. The process of the present invention is particularly adapted to the treatment of polycarbonate solutions prepared by a process wherein phosgene is passed into a solution-containing pyridine and a selected aromatic compound, and wherein pyridine hydrochloride is formed as a by-product of said process.

The invention disclosed herein obviates the need to use the commonly-employed multi-stage water wash required to achieve polymer solutions having only residual trace levels of impurities. For example, low residual levels of less than about 2 parts per million of pyridine hydrochloride contaminate can be obtained by a single pass of a polycarbonate polymer solution through a strong acid exchange resin bed according to the present invention.

DETAILED DESCRIPTION OF THE INVENTION

The polymer solutions which can be treated according to the method of the present invention include those wherein an organic base, such as pyridine, is used as a means of tying up and removing hydrochloric acid from the reaction. Hence, the invention in its broadest scope is applicable to the treatment of any polymer solutions having organic contaminants which are removed therefrom by contact of the polymer solution with a strong acid cation exchange resin bed (hereinafter referred to for convenience as the "exchange resin") which is effective in removing said contaminant. The process of the present invention is preferably employed to treat a polymer solution prepared by the typical reaction of phosgene and an aromatic dihydroxy compound, such as bisphenol A, in a solvent and in the presence of an HCl acceptor and catalyst, such as pyridine.

The invention is particularly suitable for the treatment of polycarbonate resins made from 4,4'-isopropylidenediphenol(bisphenol A), which are known in the art and improved polycarbonate and copolycarbonate resins made with phenolphthalein which are also known in the art. These particular types of polycarbonate resins can be purified according to the process of the present invention and treatment of polycarbonate solutions containing the same constitutes a preferred embodiment herein. Of course, it is to be understood that the invention is applicable to a wide variety of related and well known dihydroxy aromatic compounds such as those represented by the following formula:

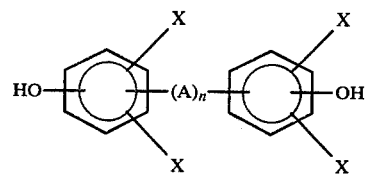

wherein A is a divalent hydrocarbon radical containing 1-15 carbon atoms, —S—, —S—S—,

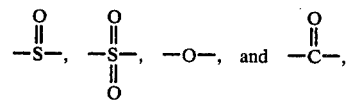

X is independently hydrogen, chlorine, bromine, fluorine, or a monovalent hydrocarbon radical such as an alkyl group of 1-4 carbons, an aryl group of 6-8 carbons and an oxyaryl group 6-8 carbons and n is 0 or 1. Phenolphthalein polycarbonate copolymers can also be treated by the invention and have been described, for example, in U.S. Pat. No. 3,036,036 and in an article by P. W. Morgan (Journal of Polymer Science: Part A, Vol. 2, page 437 (1964). These resins generally have higher melting points, higher heat distortion temperatures and better solvent resistance to chlorinated alkane solvents than regular polycarbonates made from dihydroxy aromatic compounds, such as, for example, bisphenol A (4,4'-isopropylidene diphenol).

The polymer solutions which can be treated herein can vary from a crude, highly contaminated, non-aqueous polymer solution generally containing from about 100 to about 3000 or more parts per million of contaminant. However, the polymer solution can also be a pre-water washed polymer solution which still contains undesired amounts (e.g., 50 to 100 rpm) of organic contaminant.

Ion exchange resins that can be employed in the process of the present invention are those which are of the strong acid cation exchange type. These are well known to those skilled in the art and several types are available under various known trademarks such as the DOWEX® resin series, particularly DOWEX® MSC-1 macroporous resins (available from The Dow Chemical Company), the AMBERLITE® series of resins (available from Rohm & Haas Co.) and others such as available under Lewatit, Duolite, Zerolite, etc., series of products as well as other numerous series. Preferably, the DOWEX® MSC-1 macroporous strong acid exchange resin is employed. The resins can be employed in either the wet or the dry state; if used dry, the resin also serves to remove water which may be contained in the polymer solution, from pre-washing steps or the like.

In carrying out the process, the polymer solution to be treated is passed at a controlled rate through the exchange resin bed and the effluent stream therefrom isolated in a normal manner. Sequential treatments of a polymer solution through 2 or more exchange resin beds of the same or different resin are also within the scope of the present invention. The only essential requirements in carrying out the process are that a resin which is effective to remove the contaminants be employed and that the level of impurity removal be matched with the capacity or rating of the resin employed. The amount of resin required for a particular operation can be readily determined from the level of impurity in the polymer solution and rating of the exchange resin by those skilled in the art. For example, if the particular exchange resin to be employed is rated at 4.5 meg/gram of dry resin and 100 kg of the polymer solution is equal to 1 mole of pyridine, then approximately 250 grams of the resin is required to treat 100 kg of the contaminated solution. If the polymer solution is, for example, a 10% polymer solids, then about 1000 kg of the polymer solution can be treated with such amount of exchange resin. Other means of determining amounts of exchange resin required will be apparent to those skilled in the art, and it is to be noted that acceptable, but less efficient, purification levels are often achieved even where pre-design limits are not followed. Flow rates and operating temperatures are generally only dependent upon the particular resin characteristics and solvent properties. The resin, if regenerated, is ordinarily pre-treated, such as by washing with water or solvents to remove residual ionic chloride or residual color which may be contained in the resin.

The invention is further illustrated by the following working examples.

EXAMPLE 1

Four gallons of a polycarbonate polymer solution containing 155 ppm of chloride and 427 ppm of pyridine were passed through a column (18"×1") containing 150 grams of wet DOWEX® MSC-1 strong acid resin. Samples were taken after the passage of the second, third and fourth gallons through the resin bed for analysis purposes. The results of such trial is as follows:

|  | Chloride (ppm) | Pyridine(ppm) |
|---|---|---|
| Before Resin Use | 155 | 427 |
| After Resin Use |  |  |
| After 2nd Gal | 12.4 | 2.3 |
| After 3rd Gal | 8.9 | 2.0 |
| After 4th Gal | 6.8 | 1.4 |

This example shows the dramatic decrease in the pyridine hydrochloride contaminant level obtained after passage through the resin bed.

EXAMPLE 2

In other operations similar to those set forth in Example 1, 60 gallons of a 10% solids polycarbonate polymer solution in a methylene chloride system containing 10–20% heptane were pumped through a column 6" in diameter by 2' long and packed with about 13 pounds of dry DOWEX® MSC-1 strong acid resin at a rate of 15 gallons per hour. Analysis of the treated effluent indicated the pre-treatment chloride level of the polymer solution was reduced from 14 ppm to 5 ppm while the pre-treatment pyridine level was reduced from 23 to about 3.8 ppm.

EXAMPLE 3

In operations similar to the preceding examples, a 10% solids polycarbonate polymer solution in methylene chloride was pumped at a rate of 14 gallons per hour through a column (six inches inside diameter by six feet long) containing 0.4 ft.$^3$ of DOWEX® MSC-1 macroporous strong acid resin. The treated polymer samples obtained were analyzed for pyridine content and injection molded specimens were prepared therefrom and tested (using the known Tristimulus Color measurement tests) for color and light transmission properties. Such results as compared with non-treated polymer samples are set forth in the following table. Runs 1–4 in the table reflect operations wherein the polymer solution was washed with water, but not treated with a resin according to the invention, while Runs 5–8 reflect trials wherein the polymer solution was treated with the strong acid cation exchange resin.

TABLE I

| | Polymer Solution | | Injected Molded Polymer | | | |
|---|---|---|---|---|---|---|
| | Pyridine | Pyridine | Tristimulus Color Measurements[1] | | | |
| Run No. | Content(ppm) | (ppm) | L | % T | a | b |
| 1. | 26 | 15 | 92.4 | 85.4 | 0.0 | 4.2 |
| 2. | 19 | 37 | 91.8 | 84.3 | 0.0 | 5.0 |
| 3. | 34 | 39 | 92.2 | 85.0 | 0.5 | 6.3 |
| 4. | 30 | 10 | 91.9 | 84.5 | 0.1 | 4.3 |
| Average | 27.3 | 25.3 | 92.1 | 84.8 | 0.15 | 5.0 |
| | Before Resin | After Resin | | | | |
| 5. | 29 | 7 | 6 | 93.1 | 86.7 | 0.0 | 3.5 |
| 6. | 29 | 3.8 | 4 | 92.0 | 84.6 | 0.0 | 4.7 |
| 7. | 12 | 4 | 2 | 93.0 | 86.5 | 0.0 | 3.3 |
| 8. | 31 | 0.5 | 2 | 93.5 | 87.4 | 0.0 | 3.2 |
| Average | 25.3 | 3.8 | 3.5 | 92.9 | 86.3 | 0.0 | 3.7 |

[1] L = grayness factor, 100 = water white, 0 = black %T = % light transmission
[2] a = degree reading of red; b = degree reading of yellow.

The HCl component of the pyridine HCl contaminant has an affinity for water or water of hydration present in the resin and the HCl is thus also removed from the polymer solution. Dry resins are known to act also as drying agents and are particularly desired for use in the present invention where water is present in the polymer solution to be treated.

In other operations using various polymer solutions and strong acid cation exchange resins, treated polymer solutions having little or no residual contaminants are obtained. Although the invention has been described in the above detail for the purpose of illustration, it is to be understood that modifications can be made by those skilled in the art without departing from the spirit of the invention and the scope of the claims.

What is claimed is:

1. A method of removing organic contaminants from a non-aqueous polycarbonate polymer solution containing the same which comprises contacting said polymer solution with a strong acid cation exchange resin effective to remove said contaminants therefrom, and thereafter recovering a purified polymer solution.

2. The method of claim 1 wherein substantially all of the contaminants are removed from the polymer solution.

3. The method of claim 1 wherein the contaminant is pyridine hydrochloride.

4. The method of claim 3 wherein substantially all of the contaminant is removed from the polymer solution.

5. The method of claim 1 wherein the polymer solution comprises a phenolphthalein polycarbonate polymer in a solvent and the contaminant is pyridine hydrochloride.

6. The method of claim 5 wherein substantially all of the contaminant is removed.

7. The method of claim 1 wherein the resin is a macroporous strong acid cation exchange resin.

8. The method of claim 5 wherein the resin is a macroporous strong acid cation exchange resin.

* * * * *